(12) United States Patent
Kazmi et al.

(10) Patent No.: US 10,278,107 B2
(45) Date of Patent: Apr. 30, 2019

(54) ADAPTING PRIMARY CELL INTERRUPTION BASED ON A TARGET QUALITY

(71) Applicant: Telefonaktiebolaget LM Ericsson (publ), Stockholm (SE)

(72) Inventors: Muhammad Kazmi, Bromma (SE); Björn Nordström, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/126,679

(22) PCT Filed: Mar. 23, 2015

(86) PCT No.: PCT/SE2015/050347
§ 371 (c)(1),
(2) Date: Sep. 16, 2016

(87) PCT Pub. No.: WO2015/147733
PCT Pub. Date: Oct. 1, 2015

(65) Prior Publication Data
US 2017/0094576 A1   Mar. 30, 2017

Related U.S. Application Data

(60) Provisional application No. 61/969,717, filed on Mar. 24, 2014.

(51) Int. Cl.
*H04W 36/30* (2009.01)
*H04L 1/18* (2006.01)
(Continued)

(52) U.S. Cl.
CPC .......... *H04W 36/30* (2013.01); *H04L 1/1887* (2013.01); *H04L 5/0055* (2013.01); *H04W 36/14* (2013.01);
(Continued)

(58) Field of Classification Search
None
See application file for complete search history.

(56) References Cited

U.S. PATENT DOCUMENTS

2009/0235139 A1* 9/2009 Park ...................... H04L 1/1819
714/750
2012/0176947 A1   7/2012 Xi et al.
(Continued)

FOREIGN PATENT DOCUMENTS

WO   WO 2008/023945   2/2008
WO   WO 2008/133454   11/2008

OTHER PUBLICATIONS

International Search Report for International application No. PCT/SE2015/050347—dated Jun. 26, 2015.
(Continued)

*Primary Examiner* — Chirag G Shah
*Assistant Examiner* — Amarnauth G Persaud
(74) *Attorney, Agent, or Firm* — Sage Patent Group

(57) ABSTRACT

In certain embodiments, a network node serves a wireless device capable of carrier aggregation involving a primary cell, PCell, and at least one secondary cell, SCell. The network node determines (304) a target quality for the wireless device to achieve with respect to at least the PCell; determines (308) a PCell interruption probability (e.g., probability of missed ACK/NACK in uplink) corresponding to an SCell measurement cycle that can be used by the wireless device for measuring on one or more cells of a secondary component carrier, SCC, with a deactivated SCell; adapts (312) a parameter related to the CA configuration to make it feasible to achieve the target quality, the parameter adapted based on a comparison between the target quality and the PCell interruption probability; and configures (316) the wireless device with the adapted parameter.

19 Claims, 11 Drawing Sheets

(51) Int. Cl.
*H04L 5/00* (2006.01)
*H04W 36/14* (2009.01)
*H04W 72/04* (2009.01)
*H04W 72/08* (2009.01)

(52) U.S. Cl.
CPC ..... *H04W 72/0453* (2013.01); *H04W 72/085* (2013.01)

(56) References Cited

U.S. PATENT DOCUMENTS

| | | | | |
|---|---|---|---|---|
| 2012/0263054 A1* | 10/2012 | Kazmi | ................ | H04W 24/10 370/252 |
| 2012/0281563 A1* | 11/2012 | Comsa | ................ | H04W 24/10 370/252 |
| 2013/0028126 A1* | 1/2013 | Kazmi | ................ | H04W 24/10 370/252 |
| 2013/0044621 A1* | 2/2013 | Jung | ................ | H04W 72/082 370/252 |
| 2013/0242814 A1* | 9/2013 | Wang | ................ | H04L 1/1861 370/280 |
| 2014/0177468 A1* | 6/2014 | Kazmi | ................ | H04L 41/0816 370/254 |
| 2014/0233409 A1* | 8/2014 | Lee | ................ | H04W 24/08 370/252 |
| 2015/0117283 A1* | 4/2015 | Wei | ................ | H04W 36/0088 370/311 |
| 2015/0124728 A1* | 5/2015 | Bergstrom | ................ | H04L 5/001 370/329 |
| 2015/0188793 A1* | 7/2015 | Zhao | ................ | H04L 5/1469 370/242 |
| 2015/0296394 A1* | 10/2015 | Svedman | ................ | H04L 47/266 370/223 |
| 2016/0050534 A1* | 2/2016 | Lim | ................ | G01S 5/0236 370/252 |

OTHER PUBLICATIONS

PCT Written Opinion of the International Searching Authority for International application No. PCT/SE2015/050347—dated Jun. 29, 2015.

* cited by examiner

ADAPTING PRIMARY CELL INTERRUPTION BASED ON A TARGET QUALITY

PRIORITY

This nonprovisional application is a U.S. National Stage Filing under 35 U.S.C. § 371 of International Patent Application Serial No. PCT/SE2015/050347 filed Mar. 23, 2015, and entitled "Adapting Primary Cell Interruption Based On A Target Quality" which claims priority to U.S. Provisional Patent Application No. 61/969,717 filed Mar. 24, 2014, both of which are hereby incorporated by reference in their entirety.

TECHNICAL FIELD

Particular embodiments are directed to wireless communications and, more particularly, to adapting primary cell interruption based on a target quality, such as a target block error rate.

BACKGROUND

In a wireless network, a wireless device may communicate with one or more radio network nodes to transmit and receive voice traffic, data traffic, control signals, and so on. FIG. 1 is a block diagram illustrating an example of a wireless network 100 that includes wireless devices 200 (which may interchangeably be referred to as user equipment, UEs) and network nodes 101 (which may interchangeably be referred to as enhanced node Bs, eNBs, or base stations). Each network node 101 may have an associated coverage area 120. For example, when wireless device 200b is within coverage area 120a associated with network node 101a, wireless device 200b may communicate with network node 101a to transmit or receive signal 115a. Network node 101a may be a serving cell or another cell of interest to wireless device 200b, and signal 115a may include voice traffic, data traffic, control signals, or any other suitable information communicated between a wireless device 200 and a network node 101.

Multi-Carrier or Carrier Aggregation

Certain wireless devices 200 may be able to receive data, transmit data, and/or otherwise operate with more than one serving cell. Such operation may be interchangeably referred to as multicarrier operation, carrier aggregation (CA) operation, multi-carrier system, multi-cell operation, multi-carrier operation, multi-carrier transmission, and/or multi-carrier reception. Carrier aggregation may be used for transmission of signaling and data in the uplink and downlink directions.

An individual carrier in a multi-carrier system may be referred to as a component carrier (CC). Examples of CCs include the primary component carrier (PCC), which may also be referred to as a primary carrier or anchor carrier, and the remaining one or more CCs, which may be referred to as secondary component carrier(s) (SCC(s)), secondary carrier (s), or supplementary carrier(s). The cell associated with the PCC may be interchangeably referred to as a serving cell, primary cell (PCell), or a primary serving cell (PSC). The cell associated with the SCC may be interchangeably referred to as a secondary cell (SCell) or a secondary serving cell (SSC). The PCC may carry wireless device-specific signaling. A PCC/PCell may exist in both the uplink and downlink directions in CA. In scenarios with a single UL CC, a PCell may be on the single UL CC. The network may assign different primary carriers to different wireless devices operating in the same sector or cell.

Multi-Carrier SCell Setup or Release Procedure

A multi-carrier SCell setup may refer to a procedure that enables a network node to at least temporarily setup or release the use of an SCell, in downlink (DL) and/or uplink (UL), by the CA capable wireless device 200. The SCell setup or release procedure or command may perform any one or more of: configuration of SCell(s) (i.e., SCell addition); activation of SCell(s); de-activation of SCell(s); and de-configuration of SCell(s) (i.e., SCell release);

Wireless Device Radio Measurements

Wireless device 200b may perform radio measurements with respect to network node 101a/signal 115a and/or network node 101c/signal 115c to support different functions such as mobility (e.g., cell selection, handover, etc.), positioning a wireless device, link adaption, scheduling, load balancing, admission control, interference management, interference mitigation, etc. The measurements may be performed on a serving cell as well as on neighbor cells over some known reference symbols or pilot sequences, such as primary synchronization signal (PSS), secondary synchronization signal (SSS), cell specific reference signal (CRS), channel state information-reference signal (CSI-RS), positioning reference signal (PRS), etc. In multi-carrier/CA, wireless device 200 may perform the cell measurements on the PCC as well as on one or more SCCs. Examples of measurements that a wireless device 200 may perform include cell identification, reference symbol received power (RSRP), reference symbol received quality (RSRQ), observed time difference of arrival (OTDOA), reference signals time difference (RSTD) on PRS signals, signal-to-noise ratio (SNR), signal-to-interference-plus-noise ratio (SINR), received interference power (RIP), block error rate (BLER), propagation delay between another wireless device and itself, transmit carrier power, transmit power of specific signals (e.g., transmit power of reference signals), positioning measurements, etc.

Serving Cell Interruption Due to Wireless Device Radio Measurements

Wireless device 200 may perform measurements on a deactivated SCell or other cells on the SCC with a deactivated SCell. Measurements may be performed in measurement cycles configured at wireless device 200 by higher layers. Examples of a measurement cycle may include a PRS configuration for RSTD and/or a SCell measurement cycle configured for mobility measurements (e.g., RSRP and RSRQ, respectively). SCell measurement cycles (measCycleSCell) may have periodicity of 160 ms, 320 ms, 640 ms, 1024 ms, or any other suitable period.

Wireless device 200 may retune its receiver when measuring on an SCC with deactivated SCell(s), and/or one or more neighbor cells of that SCC, without gaps. When wireless device 200 retunes its receiver before a measurement sample (such as when the bandwidth is extended to include the SCC, e.g., from 20 MHz to 40 MHz) and when wireless device 200 retunes its receiver after the measurement sample (such as when the bandwidth is reverted back to the serving carriers, e.g., from 40 MHz to 20 MHz), interruption in DL and/or UL of a serving cell occurs. The interruption may also occur when serving carrier and SCC are on the same chip. The interruption in each direction may be between 2-5 ms since wireless device 200 has to retune the center frequency and the bandwidth of the downlink. Wireless device 200 may regularly interrupt DL and/or UL of the serving cell to measure on cells of SCC with deactivated SCell(s), for example, according to the SCell measurement cycle configured by network node 101 (e.g., the eNB). Unfortunately, such interruption in DL and/or UL of a serving cell may cause serving cell performance degradation.

SUMMARY

Disclosed is a method in a network node serving a wireless device capable of carrier aggregation, CA, operation involving a primary cell, PCell, that operates on a primary component carrier, PCC, and at least one secondary cell, SCell, that operates on a secondary component carrier, SCC. The method comprises determining (304) a target quality for the wireless device to achieve for signal transmission between the wireless device and at least the PCell. The method also comprises determining (308) a PCell interruption probability corresponding to an SCell measurement cycle that can be used by the wireless device for measuring on one or more cells of a first SCC with a deactivated first SCell. The PCell interruption probability indicates a probability of missed ACK/NACK in uplink. The method also comprises adapting (312), based on a comparison between the target quality and the PCell interruption probability, at least one parameter related to the CA configuration of the wireless device. The at least one adapted parameter makes it feasible to achieve the target quality. The method also comprises configuring (316) the wireless device with the at least one adapted parameter.

Examples of adapting the at least one parameter include: configuring (312B) the SCell measurement cycle above or equal to a first threshold if the corresponding PCell interruption probability is less than the target quality, configuring (312B) the SCell measurement cycle below the first threshold if the corresponding PCell interruption probability is equal to or above the target quality, activating (312C) the first SCell, deconfiguring (312D) the first SCell, or performing (312E) a cell change to a radio access technology different than that of the current serving cell.

In certain embodiments, the PCell interruption probability is pre-defined based on the SCell measurement cycle. In certain embodiments, target block error rate, BLER, is used as the target quality. In certain embodiments, adapting the at least one parameter comprises adapting the at least one parameter provided that the determined target quality is less than or equal to the determined PCell interruption probability.

Also disclosed is a network node operable to serve a wireless device capable of carrier aggregation, CA, operation involving a primary cell, PCell, that operates on a primary component carrier, PCC, and at least one secondary cell, SCell, that operates on a secondary component carrier, SCC. The network node comprises a processor and a memory, wherein said memory contains instructions executable by said processor whereby the network node is operable to determine (304) a target quality for the wireless device to achieve for signal transmission between the wireless device and at least the PCell; determine (308) a PCell interruption probability corresponding to an SCell measurement cycle that can be used by the wireless device for measuring on one or more cells of a first SCC with a deactivated first SCell, the PCell interruption probability indicating a probability of missed ACK/NACK in uplink; adapt (312), based on a comparison between the target quality and the PCell interruption probability, at least one parameter related to the CA configuration of the wireless device, wherein the at least one adapted parameter makes it feasible to achieve the target quality; and configure (316) the wireless device with the at least one adapted parameter.

Also disclosed is a computer program product for a network node serving a wireless device capable of carrier aggregation, CA, operation involving a primary cell, PCell, that operates on a primary component carrier, PCC, and at least one secondary cell, SCell, that operates on a secondary component carrier, SCC. The computer program product comprises a non-transitory computer readable storage medium having computer readable program code embodied in the medium. The computer readable program code comprises computer readable program code to determine (304) a target quality for the wireless device to achieve for signal transmission between the wireless device and at least the PCell; computer readable program code to determine (308) a PCell interruption probability corresponding to an SCell measurement cycle that can be used by the wireless device for measuring on one or more cells of a first SCC with a deactivated first SCell, the PCell interruption probability indicating a probability of missed ACK/NACK in uplink; computer readable program code to adapt (312), based on a comparison between the target quality and the PCell interruption probability, at least one parameter related to the CA configuration of the wireless device, wherein the at least one adapted parameter makes it feasible to achieve the target quality; and computer readable program code to configure (316) the wireless device with the at least one adapted parameter.

Also disclosed is a method in a wireless device capable of carrier aggregation, CA, operation involving a primary cell, PCell, that operates on a primary component carrier, PCC, and a secondary cell, SCell, that operates on a secondary component carrier, SCC. The method comprises obtaining (404) a target quality for the wireless device to achieve for signal transmission between the wireless device and at least the PCell. The method also comprises determining (408) a PCell interruption probability corresponding to an SCell measurement cycle that can be used by the wireless device for measuring on one or more cells of a first SCC with a deactivated first SCell. The PCell interruption probability indicates a probability of missed ACK/NACK in uplink. The method also comprises adapting (412), based on a comparison between the target quality and the PCell interruption probability, at least one measurement procedure that the wireless device uses when performing radio measurements on the cells of the first SCC. The PCell interruption probability of the adapted measurement procedure makes it feasible to achieve the target quality.

In some embodiments adapting the measurement procedure comprises selecting a first measurement procedure for doing the measurements provided the target quality is less than or equal to the PCell interruption probability; and selecting a second measurement procedure for doing the measurements provided the target quality is greater than the determined PCell interruption probability. For example, in the first measurement procedure, the rate at which to retune the wireless device's radio receiver is decreased below a first threshold; and in the second measurement procedure, the rate at which to retune the wireless device's radio receiver is increased above the first threshold. As another example, in the first procedure, the rate at which to obtain measurement samples is decreased below a second threshold; and in the second procedure, the rate at which to obtain measurement samples is increased above the second threshold.

In certain embodiments, the method further comprises receiving an indication from a network node indicating the wireless device to adapt the measurement procedure; and adapting the measurement procedure based on the received indication.

The method can obtain the target quality implicitly based on parameters or explicitly via information received from a network node. In certain embodiments, the PCell interruption probability is determined based on a pre-defined mapping that maps the SCell measurement cycle to the PCell interruption probability. In certain embodiments, target block error rate, BLER, is used as the target quality.

Also disclosed is a wireless device capable of carrier aggregation, CA, operation involving a primary cell, PCell, that operates on a primary component carrier, PCC, and a secondary cell, SCell, that operates on a secondary component carrier, SCC. The wireless device comprises a processor and a memory, wherein said memory contains instructions executable by said processor whereby the wireless device is operable to: obtain (404) a target quality for the wireless device to achieve for signal transmission between the wireless device and at least the PCell; determine (408) a PCell interruption probability corresponding to an SCell measurement cycle that can be used by the wireless device for measuring on one or more cells of a first SCC with a deactivated first SCell, the PCell interruption probability indicating a probability of missed ACK/NACK in uplink; and adapt (412), based on a comparison between the target quality and the PCell interruption probability, at least one measurement procedure that the wireless device uses when performing radio measurements on the cells of the first SCC, wherein the PCell interruption probability of the adapted measurement procedure makes it feasible to achieve the target quality.

Also disclosed is a computer program product for a wireless device capable of carrier aggregation, CA, operation involving a primary cell, PCell, that operates on a primary component carrier, PCC, and a secondary cell, SCell, that operates on a secondary component carrier, SCC. The computer program product comprises a non-transitory computer readable storage medium having computer readable program code embodied in the medium. The computer readable program code comprises computer readable program code to obtain (404) a target quality for the wireless device to achieve for signal transmission between the wireless device and at least the PCell; computer readable program code to determine (408) a PCell interruption probability corresponding to an SCell measurement cycle that can be used by the wireless device for measuring on one or more cells of a first SCC with a deactivated first SCell, the PCell interruption probability indicating a probability of missed ACK/NACK in uplink; and computer readable program code to adapt (412), based on a comparison between the target quality and the PCell interruption probability, at least one measurement procedure that the wireless device uses when performing radio measurements on the cells of the first SCC, wherein the PCell interruption probability of the adapted measurement procedure makes it feasible to achieve the target quality.

Some embodiments of the disclosure may provide one or more technical advantages. As an example, certain embodiments configure an SCell measurement cycle according to settings that avoid a negative impact on control channel link adaptation performance while allowing a control channel target block error rate to be configurable. A configurable control channel target block error rate may be advantageous because, for example, different services may require different levels of robustness for control channel transmissions, or different network deployments may benefit from different settings. Another advantage of some embodiments is that overall system capacity may be enhanced compared to that of a conventional system. Yet another advantage of some embodiments is that a target quality of the service for a wireless device may be met even when a service requested by the wireless device requires a very low target block error rate (e.g., 0.25% for services like video steaming). Some embodiments may benefit from some, none, or all of these advantages. Other technical advantages may be readily ascertained by one of ordinary skill in the art.

BRIEF DESCRIPTION OF THE DRAWINGS

For a more complete understanding of the present disclosure and its features and advantages, reference is now made to the following description, taken in conjunction with the accompanying drawings.

DETAILED DESCRIPTION

Figure 1:
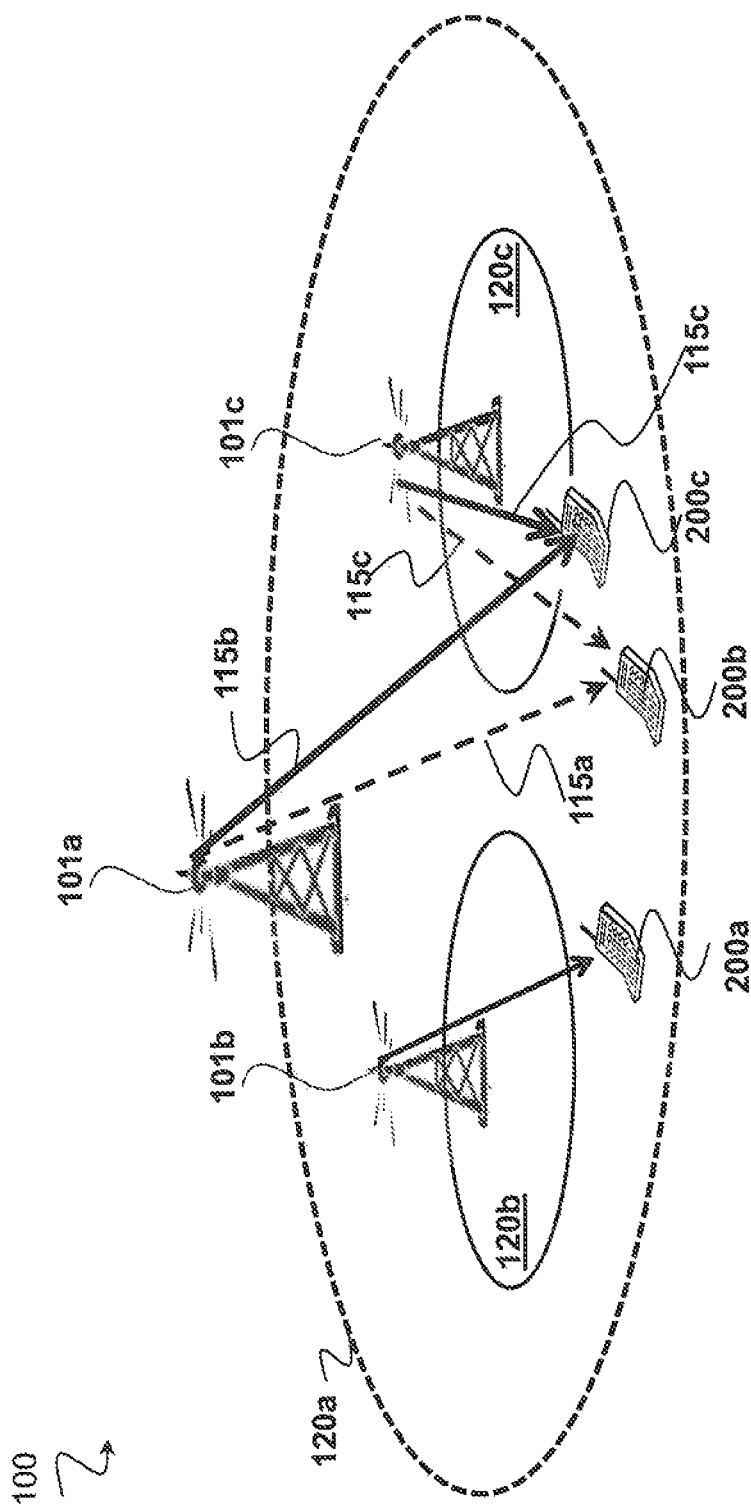
FIG. 1 is a block diagram illustrating an example embodiment of a wireless network, according to a particular embodiment.

Particular embodiments will now be described more fully hereinafter with reference to the accompanying drawings, however, other embodiments may include many different forms and should not be construed as limited to the examples set forth herein. Embodiments of the disclosure need not be mutually exclusive, and components described with respect to one embodiment may be used in another embodiment.

Maintaining good signal quality between wireless device 200 and network node 101 may allow for good performance, such as high bitrate transmissions or robust control channel performance. However, it may be difficult to maintain good signal quality in complex radio environments. For example, in multicarrier or carrier aggregation (CA) operation, wireless device 200 may be able to receive and/or transmit data to more than one network node 101. In certain CA configurations, wireless device 200 may interrupt transmission and reception on a primary cell (PCell) to perform measurements on a secondary cell (SCell) or neighbor cells of the SCell. Interruption of the PCell transmission and reception may cause PCell performance degradation.

An example metric to express such serving cell performance degradation is expressed in terms a serving cell (e.g., PCell) interruption probability of missed ACK/NACK in the uplink. If wireless device 200 has two or more SCells, then an interruption may occur on the activated SCell due to measurements on cells of the SCC with deactivated SCell. This example metric is further elaborated below.

In a particular embodiment, such as an LTE example, a transmission opportunity or scheduling instance is 1 ms (i.e., 1 transmission time interval, TTI). Thus, as an example, the number of packets lost in LTE is ten if wireless device 200 is unable to transmit ten ACK/NACK in UL in response to continuous DL transmission over a period of 100 ms. In this example, the corresponding interruption probability of missed ACK/NACK in UL is 10% or 0.1. This may also be referred to as the probability with which the fraction of ACK/NACK transmitted in the uplink in response to continuous DL transmission over a period are missed or dropped or lost. The interruption probability may also be expressed as a ratio of (a) the number of missed ACK/NACK in response to continuous transmission of data to wireless device 200 from its serving cell over certain time period (T0) to (b) the total number of ACK/NACK in response to continuous transmission of data to wireless device 200 from its serving cell if all data blocks are received. A serving cell interruption probability of missed ACK/NACK in the uplink may also be interchangeably referred to as the serving cell interruption probability or PCell interruption probability.

In a particular embodiment, such as LTE example, wireless device 200 may provide information on its experienced reception quality to network node 101 by means of channel quality indicator (CQI) reports. This information may be used by network node 101 to adjust robustness of downlink transmissions to wireless device 200. In performing such adjustments, network node 101 may attempt to optimize efficiency (e.g., number of bits per resource block) while maintaining quality (e.g., probability of block error).

As an example, for transmissions on physical downlink shared channel (PDSCH) and physical downlink control channel (PDCCH), link adaptation functionality may control the efficiency and resulting probability for block error. In a PDSCH example, the modulation and coding scheme (MCS) may be adapted according to the channel quality of wireless device 200. That is, the link adaptation may select both a modulation (e.g., QPSK, 16QAM, 64QAM, etc.) as well as a code rate for a transmission such that a suitable probability of block error is achieved. In a PDCCH example, a code rate of each transmission may be adapted according to the channel quality of wireless device 200. That is, for a given transport block size of the downlink control information (DCI), link adaptation may select to transmit this information on 1, 2, 4 or 8 control channel elements (CCEs) where a higher number of CCEs results in a lower code rate and therefore more robust transmission.

In a particular embodiment, an overall quality of PDSCH or PDCCH transmissions to wireless device 200 may be measured as a resulting block error rate (BLER) over a series of transmissions. Typically, network node 101 aims to fulfill a target BLER when performing link adaptation. Suitable BLER targets may depend on service dependent requirements such as delay or network optimization requirements and/or the channel (e.g., PDSCH or PDCCH).

In a particular embodiment, link adaptation for transmissions to wireless device 200 may consist of an outer loop correction which may be based on feedback from decoding result information provided from wireless device 200 to a network node 101 during normal hybrid-ARQ (HARQ) operation. That is, information on whether a transmission was successfully decoded in wireless device 200 is used such that the resulting BLER converges to the target. An outer loop may correct imperfections in wireless device channel quality measurements, CQI reporting, etc., and/or imperfections in network node 101 assumptions and/or estimations. As an example, an outer loop for PDSCH may be based on reception of HARQ ACK or NACK. An ACK may indicate that a transmission was successfully received by a wireless device 200 given its instantaneous channel quality and therefore indicate that the MCS used in the transmission was adequately robust. A NACK may indicate that a transmission was not successfully received by wireless device 200 and that the MCS that was used may have been too aggressive. Link adaptation may use this information to perform an outer loop adjustment to a channel quality estimate provided by wireless device 200.

As another example, an outer loop for PDCCH may use absence or presence of expected HARQ feedback for the corresponding PDSCH transmission as input. Absence of expected feedback, i.e., HARQ discontinuous transmission (DTX), for a PDSCH transmission may be interpreted as if the associated transmission on PDCCH was not successfully received by wireless device 200. A HARQ ACK or NACK for the corresponding PDSCH transmission may instead indicate that a PDCCH transmission was successfully received by wireless device 200. This information may be used as an indication that a too aggressive code rate was used or if the code rate was robust enough. Link adaptation may use this information to perform an outer loop adjustment to a channel quality estimate provided by wireless device 200.

In certain configurations of carrier aggregation, performance degradation can occur when wireless device 200 interrupts reception and transmission on the primary cell (PCell) to perform measurements on a secondary cell (SCell) and/or neighbor cells of the SCC when the SCell is deactivated. A particular example of such CA configuration is when a SCell measurement cycle for measuring on cells on SCC is 640 ms or longer. The number and instances of such interruptions may be UE implementation specific. Therefore, an eNB may not be aware of an occurrence of such an interruption. Such interruptions may negatively interact with any link adaptation algorithm in a network node 101 that uses HARQ ACK, NACK, or discontinuous transmission (DTX) as input for outer loop (OL) correction of channel estimates because the interruptions may appear as random HARQ DTX by network node 101.

In particular embodiments, the impact of PCell interruptions on performance of outer loop link adaptation may depend upon a relationship between a target BLER of the outer loop algorithm and a probability for interruptions. For example, if an interruption probability and a preferred target BLER of transmissions of downlink control data (PDCCH transmissions) are in the same range, such as 0.5%-2.0%, the interruption may make it difficult to achieve the target BLER. In certain scenarios, such as when the interruption probability is greater than the target BLER, it might not be feasible to achieve the target BLER.

A negative impact on PDCCH Link adaptation performance, in terms of increase of control channel element (CCE) utilization, may be expected if there is no coordination between target BLER and interruption probability. An increase in the CCE utilization may decrease the system capacity because fewer wireless devices 200 may be served at the same time. An interruption may also require retransmissions of missed or lost packets between a wireless device 200 and a network node 101. This in turn may increase delay and may also degrade the quality of service perceived by wireless device 200.

Certain embodiments of the present disclosure may provide solutions to this or other problems. According to some embodiments, a network node 101 may use a target BLER of a PDCCH link adaptation to decide which measurement cycles may be feasible to use for SCell measurements. Particular embodiments may implement such a solution in a network node 101 serving a wireless device 200 by comparing a preferred target BLER to a specified serving cell (e.g. PCell) interruption probability associated with an SCell measurement cycle and, if possible, selecting a SCell measurement cycle that does not cause a negative impact on PDCCH link adaptation. In particular embodiments, when no measurement cycle can be found that is feasible to apply with the setting of a PDCCH target BLER, network node 101 may instead avoid a negative impact on PDCCH link adaptation by prohibiting deactivation of the SCell, deconfiguring the SCell (aka deconfiguring the SCC), or doing a handover to another radio access technology (RAT), such as a high speed packet access (HSPA) RAT.

According to some embodiments, wireless device 200 may compare a configured target BLER with a pre-defined value of a serving cell (e.g., PCell) interruption probability associated with a configured SCell measurement cycle. Based on this comparison, wireless device 200 may adapt one or more measurement procedures for measurements on cells of the SCC, such that a serving cell (e.g., PCell) interruption probability may change with respect to a pre-defined value and a target BLER is met.

Figure 2:
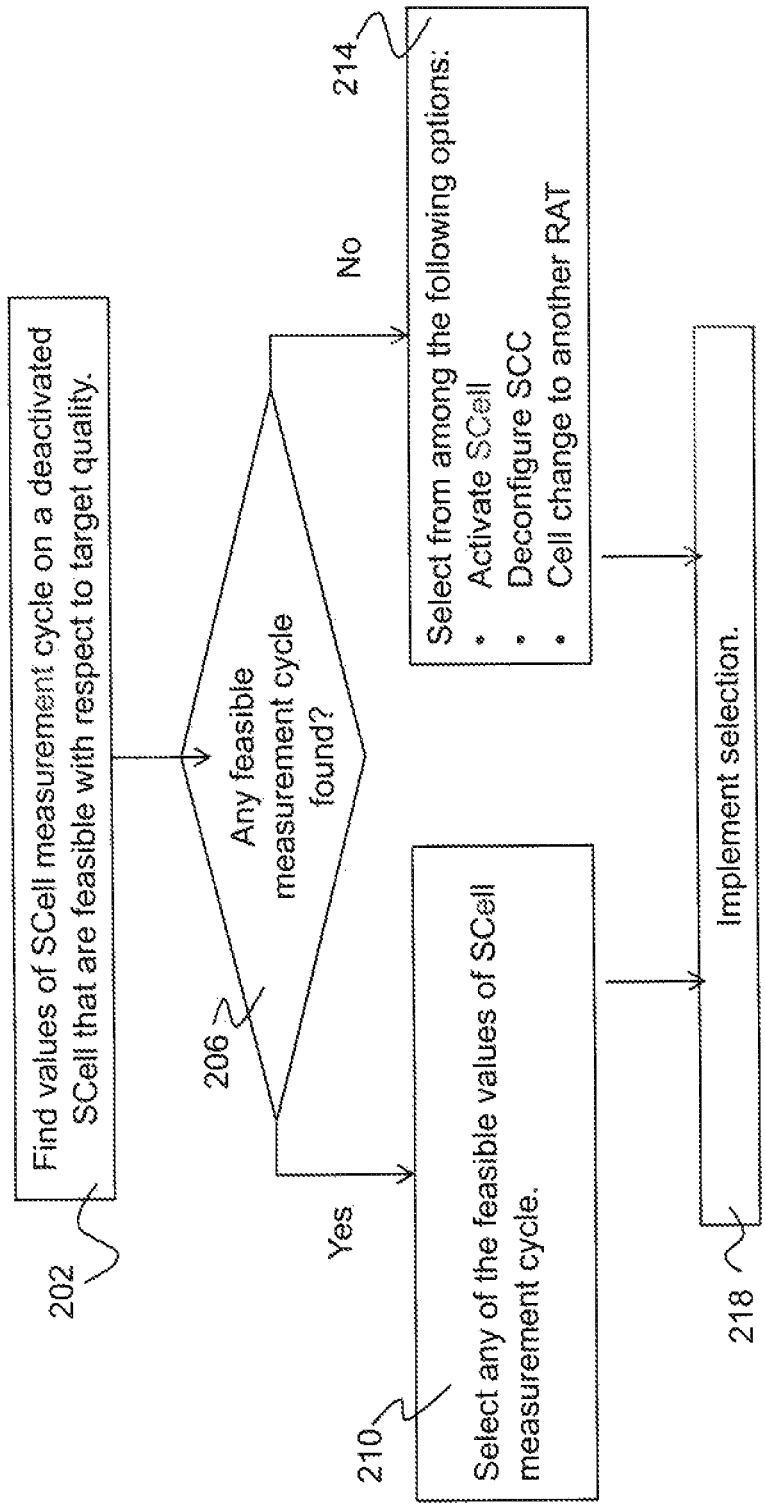
FIG. 2 is a flowchart diagram illustrating an example of a method in a network node for adapting a parameter related to the CA configuration of a wireless device that has a deactivated SCell, according to a particular embodiment.

FIG. 2 is a flowchart diagram illustrating an example of a method in a network node 101 for adapting a parameter related to the CA configuration of a wireless device 200 that has a deactivated SCell, according to a particular embodiment.

In the example, wireless device 200 is configured with at least a serving cell (PCell) and at least one SCC (first SCC) that is deactivated or is expected to be deactivated. Although wireless device 200 could be configured with two or more SCCs with deactivated SCells, for simplicity, the following example will be described using one SCC with deactivated SCell. The first SCC may be configured by a first network node 101 that serves the serving cell (e.g., PCell) or by another network node 101 (a second network node). In some embodiments, the first and second network nodes may be an eNodeB and a radio remote head (RRH), respectively. In some embodiments, the first and second network nodes may be the same or may be co-located in the same site or location.

When the first SCC is configured with the first SCell deactivated, wireless device 200 may be configured with at least one measurement cycle for performing one or more measurements on one or more cells on the first SCC. Examples of measurement cycles may include measCycleSCell or PRS configuration used for OTDOA RSTD measurements by wireless device 200.

Network node 101 may determine a target quality for wireless device 200 for meeting UL and/or DL signal quality. Throughout the present disclosure, target quality may interchangeably be referred to as quality target, quality of service target, or service target quality. A target quality may be associated with one or more services (e.g., VoIP, speech, video streaming, packet data, etc.). A target quality may be expressed as target block error rate (BLER), frame error rate (FER), bit error rate (BER), packet error rate (PER), SINK, SNR, etc. A target quality may be configured at a wireless device 200 by a network node 101. A target quality may be set or configured separately for UL and DL at the network node 101 and at the wireless device 200.

At step 202, network node 101 attempts to find values of the SCell measurement cycle on a deactivated SCell that are feasible with respect to the target quality. According to some embodiments, network node 101 may have access to a predefined serving cell interruption probability for each of the measurement cycle settings (e.g., each setting of measCycleSCell). Such information may be available and pre-defined in a standard (e.g., 3GPP TS 36.133). A network node may implement a link adaptation algorithm including an HARQ feedback based outer loop adjustment with a configured target quality, such as target BLER. The target BLER may be configured at wireless device 200 for achieving a desired performance in the DL.

At step 206, network node 101 determines if any feasible measurement cycle was found. A feasible value of a measurement cycle may ensure that wireless device 200 is able to meet the target quality on the serving cell (e.g., PCell) while wireless device 200 measures on the first SCC according to the selected measurement cycle. For example, if network node 101 finds one or more measCycleSCell settings that make it feasible to achieve the target BLER, network node 101 may proceed to step 210 to select which of the feasible values of measCycleSCell should be configured at wireless device 200 for performing measurements on a first SCC with a deactivated SCell.

An example criterion for selecting a feasible measCycleSCell may be explained by the following example. A setting of measCycleSCell may be considered feasible if an associated interruption probability is lower than a configured target BLER. A setting of measCycleSCell may be considered not feasible if its associated interruption probability is equal to, or higher than a configured target BLER. If several feasible settings of measCycleSCell and are found, selection among those that are feasible may be based on other aspects or criteria. Examples of such criteria may include wireless device 200 battery optimization, measurement performance (e.g. measurement time of the first SCC), etc. For example, a longer measCycleSCell (i.e., with longer periodicity) may be selected if there is a need to optimize the battery power consumption of wireless device 200. As another example, a shorter measCycleSCell (i.e., with shorter periodicity) may be selected if a measurement time of measurements done on cells of a first SCC needs to be reduced.

As a particular example, the serving cell interruption probability may be 0% for values of measCycleSCell that are less than 640 ms and 0.5% for values higher than or equal to 640 ms. In such an example, a network node may apply the following logic for selecting the measCycleSCell:

If PDCCH target BLER>threshold (e.g., 0.5%) then the network node configures measCycleSCell to a value larger than or equal to 640 ms.

Otherwise, the network configures measCycleSCell to a value lower than 640 ms.

Returning to the description of step 206, in some embodiments, network node 101 may be unable to select or find a feasible measCycleSCell at step 206. As an example, it may be that all the pre-defined measCycleSCell will cause at least certain level of serving cell interruption probability (e.g., 0.5%). Thus, when using any of the measCycleSCell, it might not be feasible for wireless device 200 to meet a target quality for certain values (e.g., BLER with 0.5% or less). If all available measurement cycles cause interruption probability of 0.5% then the system performance and/or wireless device 200 performance for services for which target quality is set to more than 0.5% will likely be degraded. Accordingly, if at step 206 network node 101 does not find a feasible measurement cycle, the method may proceed to step 214 where network node 101 selects from one or more alternative options, such as activating the deactivated SCell, deconfiguring SCC (falling back to single carrier operation), cell change to another RAT, and/or switching or selecting between different solutions based on criteria. These examples are further described below.

Activating SCell

Network node 101 may prohibit negative interaction with link adaptation by not deactivating the SCell for wireless device 200. In other words, when target BLER is equal to or larger than a pre-defined serving cell interruption probability for all possible measCycleSCells, network node 101 may activate the first SCell and retain its activation state at least until the target BLER is changed (e.g., increased compared to the value of the pre-defined serving cell interruption probability).

As a particular example, the interruption probability may be 0.5% for all settings of measCycleSCell. In such an example, network node 101 may apply the following logic:
  If target BLER>0.5%, then network node 101 configures measCycleSCell to a value larger than 640 ms.
  Otherwise (e.g., if target BLER<0.5%), network node 101 does not deactivate the SCell or activates the deactivated SCell and sends the activation command to wireless device 200 (e.g., MAC command).

Deconfiguring SCC

In some embodiments, if network node 101 is unable to select or find a feasible measCycleSCell (e.g., if target quality cannot be met with any of the current measCycleSCells) then network node 101 may decide to deconfigure a currently configured first SCC or it may not configure a first SCC at wireless device 200. That is, wireless device 200 may fall back to single carrier operation. Wireless device 200 may be served by only the PCell with the desired target quality. For example, if the target BLER is 0.5% but all pre-defined measurement cycles will cause the serving cell interruption probability of 0.5% or more, then network node 101 may determine not to configure wireless device 200 with the first SCC or, if it is already configured, then network node 101 may deconfigure the first SCC at wireless device 200. If wireless device 200 supports more than one SCC, then network node 101 may determine not to configure wireless device 200 with any of the SCCs until the current target quality is changed or if the current session or call is completed. Similarly, if wireless device 200 is currently configured with more than one SCC, then all of them may be deconfigured by network node 101. As a particular example, network node 101 may deconfigure an SCC by sending a radio resource control (RRC) message to wireless device 200. An advantage of this embodiment may include better wireless device battery optimization because the battery power consumption of wireless device 200 may be reduced.

Cell Change to Another RAT

In some embodiments, if no pre-defined measurement cycles are feasible, then network node 101 may decide to change from the RAT of the current cell serving wireless device 200 to another RAT of another cell. That is, if a target quality of the service desired by wireless device 200 cannot be met with the currently configured measurement cycle or even with any of the available measurement cycles within the current RAT, then the network node may handover to another RAT. The target RAT may configure wireless device 200 with single or multiple carriers and may ensure that wireless device meets the target BLER for the desired service. As an example, in certain embodiments a network node 110 that uses LTE as the RAT may handover to a cell that uses HSPA as the RAT.

Switching Between Different Solutions Based on Criteria

In some embodiments, network node 110 may use one or more criteria to decide which of the methods or combination of methods described with respect to steps 206-214 may be used for serving the cell with the desired target quality. Examples of criteria may include wireless device 200's battery power consumption, traffic requirements of wireless device 200, amount of traffic in the buffer, measurement performance of measurements on SCC, target quality, serving cell interruption probability associated with different measurement cycles (e.g., maximum and minimum probabilities), etc.

For example, if wireless device 200 requires higher data rate and/or buffer size is above a threshold, then network node 110 may decide to use the "activate the SCC" method or the "cell change to another RAT" method provided the target RAT also supports multi-carrier (e.g., HSPA). These methods may ensure that wireless device 200 may still be served by higher data rate.

As another example, if wireless device 200's battery consumption needs to be optimized (e.g., if wireless device 200's battery is below a threshold or if a current service will consume significant power), then network node 101 may decide to use the "deconfigure the first SCC" method.

Continuing to step 218, network node 101 implements the selection (e.g., network node 101 implements the measurement cycle selected at step 210 or the option selected at step 214, such as activating the SCell, deconfiguring the SCC, or cell change to another RAT).

FIGS. 3A-3E are flowchart diagrams illustrating examples of methods in a network node 101 for adapting a parameter related to the CA configuration of a wireless device 200 that has a deactivated SCell, according to particular embodiments. With respect to FIG. 3A, at step 304A, network node 304 determines a target quality for wireless device 200 to achieve for signal transmission between wireless device 200 and at least the PCell. A target quality may be expressed as target block error rate (BLER), frame error rate (FER), bit error rate (BER), packet error rate (PER), SINR, SNR, etc. In some embodiments, network node 101 determines the target quality based on the service (e.g., VoIP, speech, video streaming, packet data, etc.). Target quality can be determined for the UL and/or DL.

At step 308A, network node 101 determines a PCell interruption probability corresponding to an SCell measurement cycle that can be used by wireless device 200 for measuring on one or more cells of a first SCC with a deactivated first SCell. As described above, the PCell interruption probability indicates a probability of missed ACK/NACK in uplink. The PCell interruption probability may be pre-defined based on the SCell measurement cycle. As an example, in certain embodiments the possible SCell measurement cycles could include 160 ms, 320 ms, 640 ms, and 1024 ms, and these measurement cycles could have a pre-defined mapping to PCell interruption probability of 0%, 0%, 0.5%, and 0.5%, respectively. In the example, the SCell measurement cycles having a PCell interruption probability of 0% may continuously monitor the bandwidth that includes the SCC, thereby avoiding interruptions associated with retuning the bandwidth each measurement cycle. A tradeoff of using the SCell measurement cycles having a PCell interruption probability of 0% is that they tend to consume more resources of wireless device 200 than SCell measurement cycles having higher PCell interruption probability.

At step 312A, network node 101 adapts, based on a comparison between the target quality and the PCell interruption probability, at least one parameter related to the CA configuration of wireless device 200. In some embodiments, network node 101 determines to adapt the parameter(s) provided that the determined target quality is less than or equal to the determined PCell interruption probability. Thus, the parameter(s) can be adapted to make it feasible to achieve the target quality. Examples of parameters that can be adapted include SCell measurement cycle, activating the SCell, deconfiguring the SCell (aka deconfiguring the SCC), and changing to another RAT. At step 316A, network node 101 configures wireless device 200 with the at least one adapted parameter.

Figure 3A:
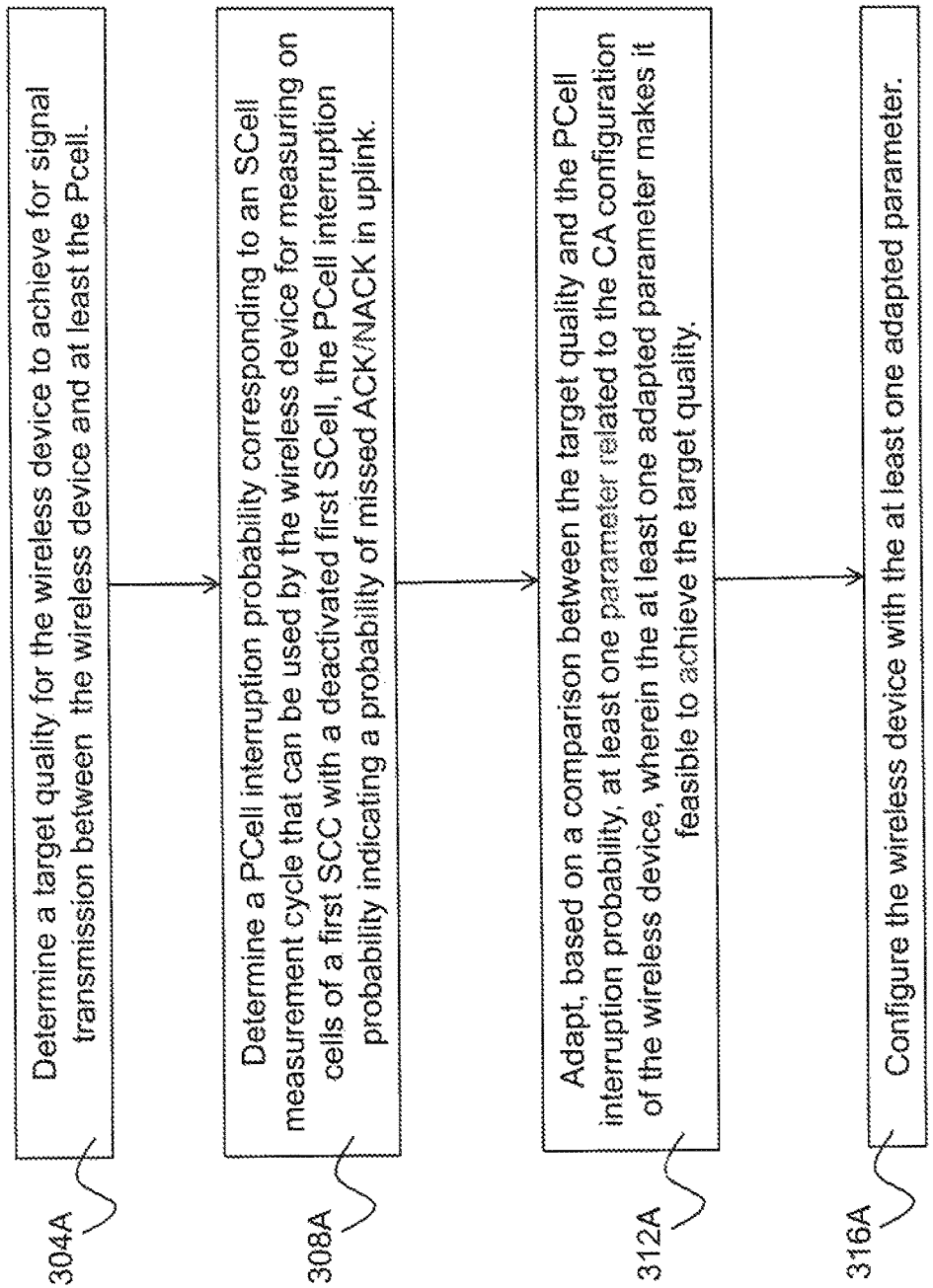
FIGS. 3A-3E are flowchart diagrams illustrating examples of methods in a network node for adapting a parameter related to the CA configuration of a wireless device that has a deactivated SCell, according to particular embodiments.
Figure 3B:
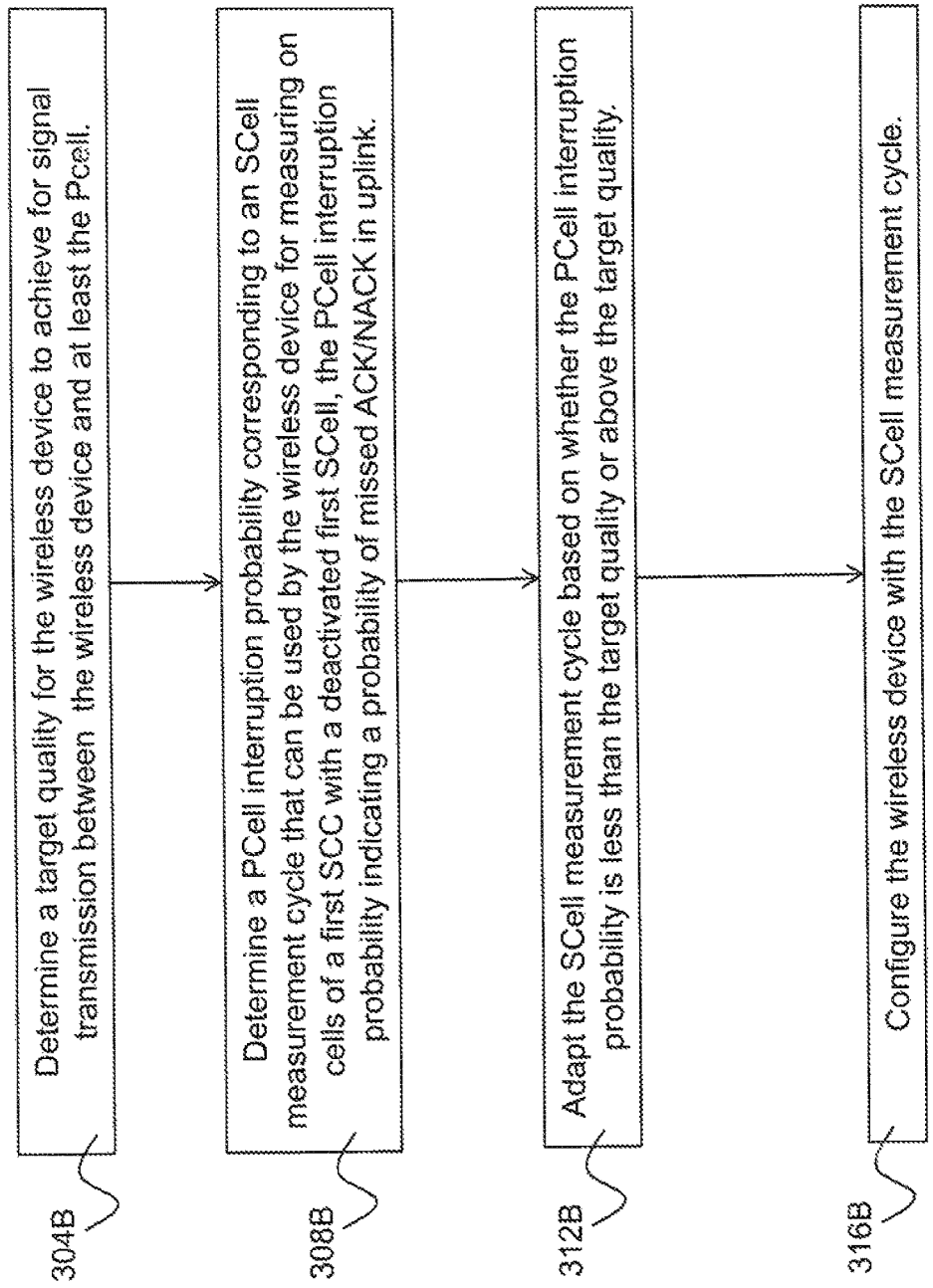

FIG. 3B illustrates an example in which steps 304B-308B are generally analogous to steps 304A-308A of FIG. 3A. At step 312B, adapting the at least one parameter comprises configuring the SCell measurement cycle based on whether the PCell interruption probability is less than the target quality or above the target quality. If the PCell interruption probability is less than the target quality, network node 101 configures the SCell measurement cycle above or equal to a first threshold. However, if the PCell interruption probability is equal to or above the target quality, network node 101 configures the SCell measurement cycle below the first threshold.

For example, suppose that: a) the threshold value is 640 ms, b) the PCell interruption probability for measurement cycles less than 640 ms is 0%, and c) the PCell interruption probability is 0.5% for measurement cycles that are greater than or equal to 640 ms. If the target quality is 2.0% BLER, the PCell interruption probability associated with the threshold value (0.5%) is less than the target quality (2.0%), so network node 101 configures the SCell measurement cycle above or equal to the threshold value of 640 ms (e.g., the SCell measurement cycle could be configured to 640 ms or 1024 ms). However, if the target quality is 0.25% BLER, the PCell interruption probability associated with the threshold value (0.5%) is greater than the target quality (0.25%), so network node 101 configures the SCell measurement cycle less than the threshold value of 640 ms (e.g., the SCell measurement cycle could be configured to 160 ms or 320 ms).

At step 316B, network node 101 configures wireless device 200 with the selected SCell measurement cycle.

Figure 3C:
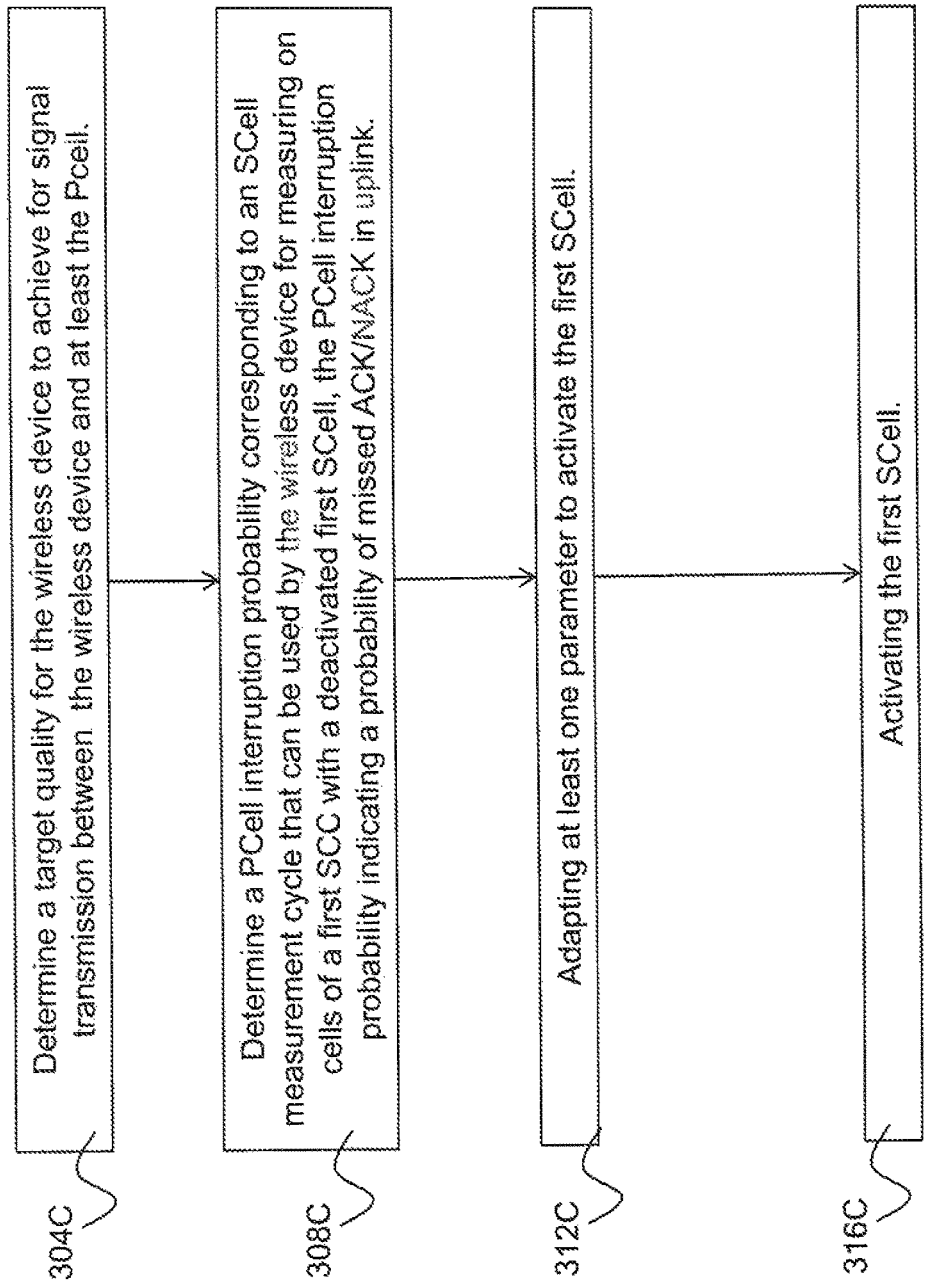

FIG. 3C illustrates an example in which steps 304C-308C are generally analogous to steps 304A-308A of FIG. 3A. At step 312C, adapting the at least one parameter comprises activating the first SCell. An example of activating the first SCell was described with respect to step 214 of FIG. 2 above. At step 316C, network node 101 activates the first SCell according to the adapted parameter(s).

Figure 3D:
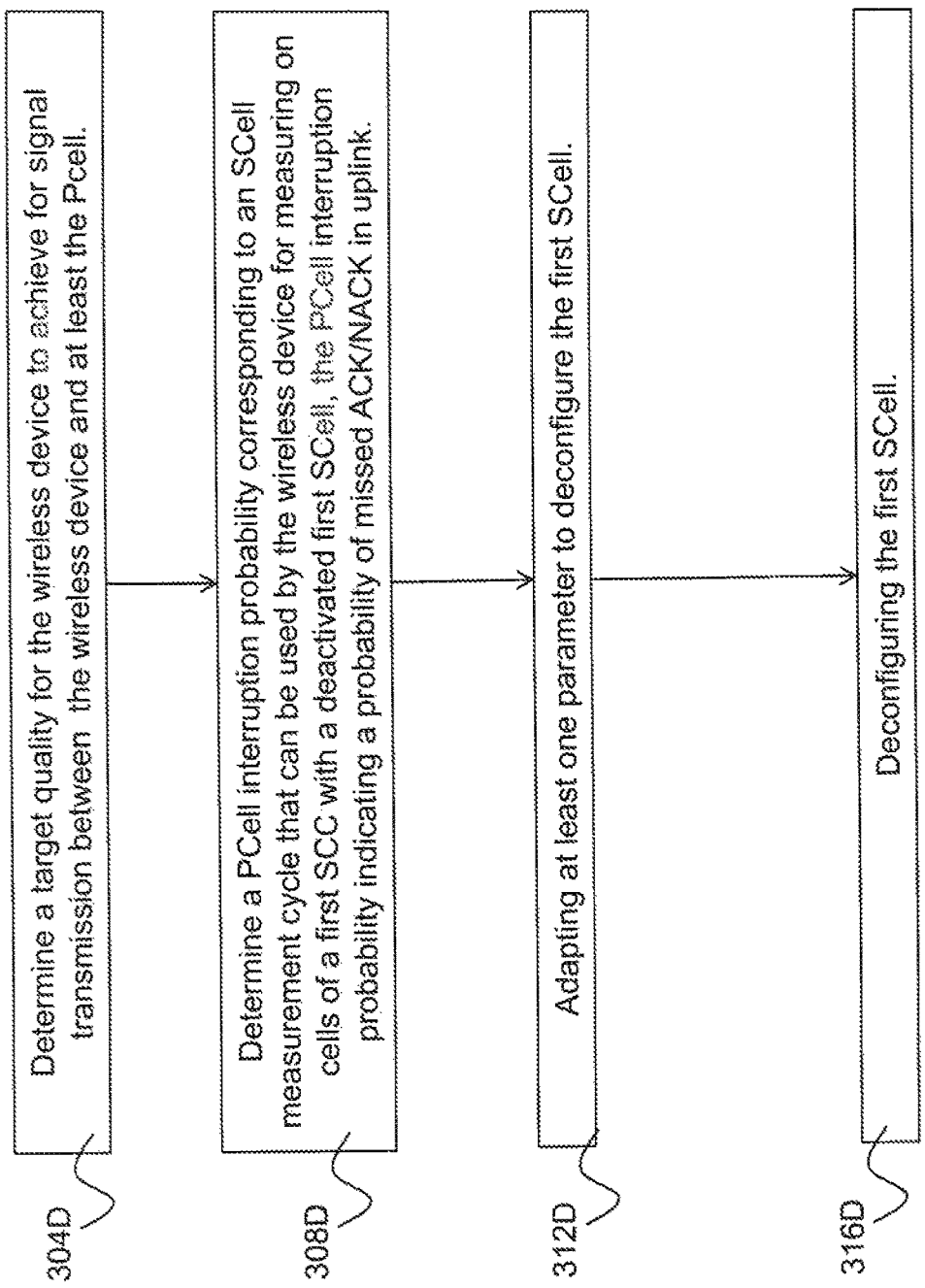

FIG. 3D illustrates an example in which steps 304D-308D are generally analogous to steps 304A-308A of FIG. 3A. At step 312D, adapting the at least one parameter comprises deconfiguring the first SCell. When the first SCell is deconfigured, then the entire first SCC is also deconfigured. An example of deconfiguring the SCC was described with respect to step 214 of FIG. 2 above. At step 316D, network node 101 deconfigures the first SCC according to the adapted parameter(s).

Figure 3E:
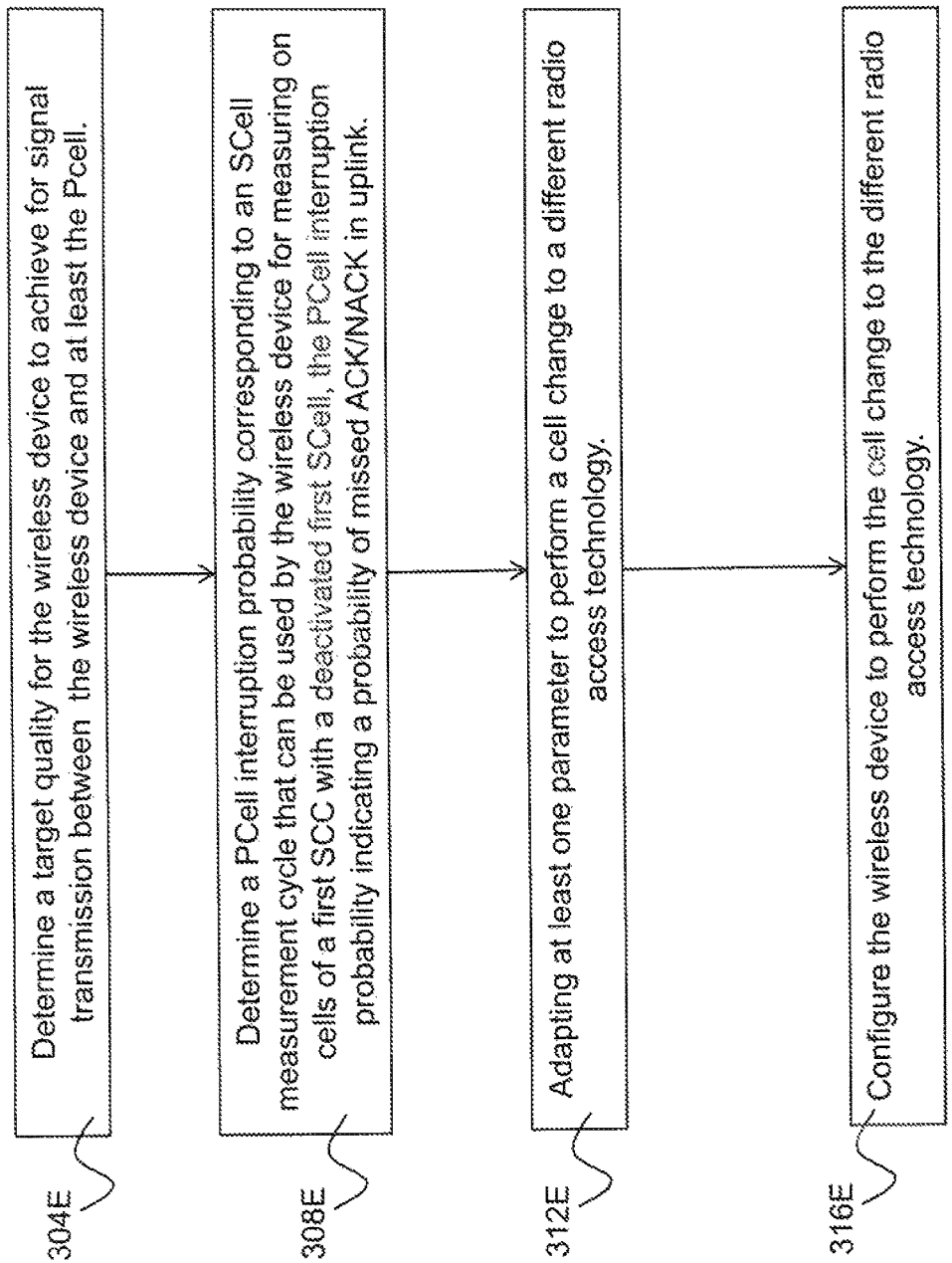

FIG. 3E illustrates an example in which steps 304E-308E are generally analogous to steps 304A-308A of FIG. 3A. At step 312E, adapting the at least one parameter comprises performing a cell change to a different RAT. An example of performing a cell change was described with respect to step 214 of FIG. 2 above. At step 316E, network node 101 configures wireless device 200 to perform the cell change to the different RAT according to the adapted parameter(s).

Figure 4:
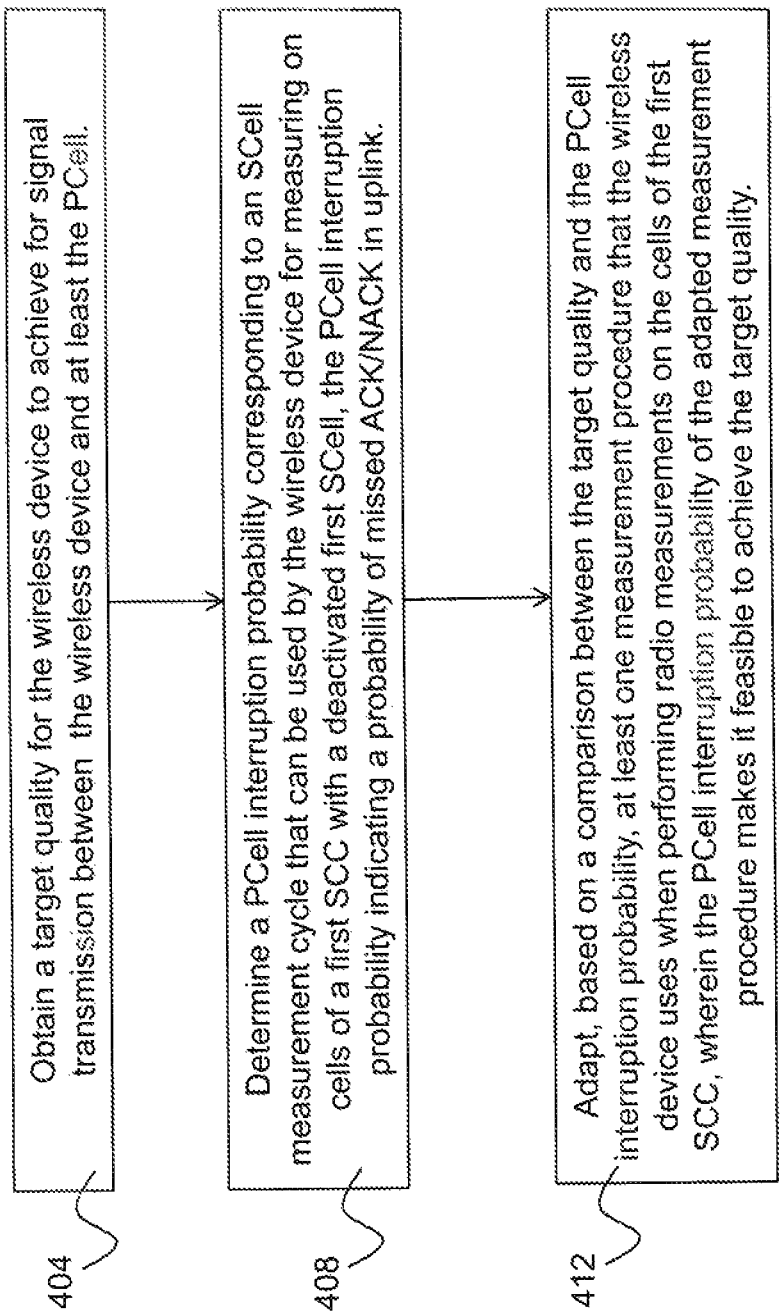
FIG. 4 is a flowchart diagram illustrating an example of a method in a wireless device for adapting a measurement procedure that it uses when performing radio measurements on the cells of an SCC with a deactivated SCell, according to a particular embodiment.

FIG. 4 is a flowchart diagram illustrating an example of a method in a wireless device 200 for adapting a measurement procedure that it uses when performing radio measurements on the cells of an SCC with a deactivated SCell, according to a particular embodiment. At step 404, wireless device 200 obtains a target quality for wireless device 200 to achieve for signal transmission between itself and at least the PCell. The target quality may be determined implicitly based on parameters (e.g., HARQ parameter setting such as maximum number of retransmissions, etc.) or explicitly via information from network node 101 (e.g., via RRC signaling, MAC signaling). Target quality may be expressed as target block error rate (BLER), frame error rate (FER), bit error rate (BER), packet error rate (PER), SINR, SNR, etc.

At step 408, wireless device 200 determines a PCell interruption probability corresponding to an SCell measurement cycle that can be used by wireless device 200 for measuring on one or more cells of a first SCC with a deactivated first SCell, the PCell interruption probability indicating a probability of missed ACK/NACK in uplink. In some embodiments, wireless device 200 determines the PCell interruption probability based on a pre-defined mapping that maps the SCell measurement cycle to the PCell interruption probability.

At step 412, wireless device 200 autonomously adapts, based on a comparison between the target quality and the PCell interruption probability, at least one measurement procedure that wireless device 200 uses when performing radio measurements on the cells of the first SCC, wherein the PCell interruption probability of the adapted measurement procedure makes it feasible to achieve the target quality. In certain embodiments, wireless device 200 selects a first measurement procedure for doing the measurements provided the target quality is less than or equal to the PCell interruption probability, and selects a second measurement procedure for doing the measurements provided the target quality is greater than the determined PCell interruption probability.

As an example, in the first measurement procedure, the rate at which to retune wireless device 200's radio receiver is decreased below a first threshold, and in the second measurement procedure, the rate at which to retune wireless device 200's radio receiver is increased above the first threshold. Thus, in the example, adapting the measurement procedure may comprise modifying radio receiver retuning rate by changing the rate/how often wireless device 200 retunes its radio receiver for measuring on cells of the first SCC. The retuning may be needed to change the bandwidth, e.g., between 20 MHz and 40 MHz.

As another example, in the first procedure, the rate at which to obtain measurement samples is decreased below a second threshold, and in the second procedure, the rate at which to obtain measurement samples is increased above the second threshold. Thus, in the example, adapting the measurement procedure may comprise modifying how often wireless device 200 obtains the measurement samples to perform measurements.

In some embodiments, wireless device 200 may decrease a serving cell interruption probability by reducing any one or both of the above retuning and measurement rates below their respective thresholds. This may be referred to as a first measurement procedure.

In some embodiments, wireless device 200 may increase a serving cell interruption probability by increasing any one or both of the above retuning and measurement sampling rates above their respective thresholds. This may be referred to as a second measurement procedure. The above pre-defined rules may be explained with reference to the following examples.

As one example, wireless device 200 may be required to lower a serving cell interruption probability below a pre-defined value to ensure that a target quality is met:
- if the configured target quality (e.g., target BLER=0.5%) is equal to or less than the serving cell interruption probability (0.5%) associated with the configured measurement cycle for the first SCC with deactivated first SCell at wireless device 200, then
- wireless device 200 may autonomously adapt one or more measurement procedures for doing measurements on the cells of the first SCC such that the serving cell interruption probability may fall below the target quality, e.g., interruption probability falls to 0.25%.

As another example, wireless device 200 may be allowed to increase a serving cell interruption probability above a pre-defined value provided that a target quality is met:
- if the configured target quality (e.g., target BLER=1%) is larger than the serving cell interruption probability (0.5%) associated with the configured measurement cycle for the first SCC with the deactivated first SCell at wireless device 200, then
- wireless device 200 may autonomously adapt one or more measurement procedures for doing measurements on the cells of the first SCC such that the serving cell interruption probability remains below the target quality but can be larger than the pre-defined value, e.g., interruption probability falls to 0.75%.

The above method may be pre-defined in a standard as a rule for wireless device 200. In a particular embodiment, wireless device 200 may always apply such rule (e.g., wireless device 200 always compares the target quality with the interruption probability to adapt the measurement procedure, if needed). In a particular embodiment, wireless device 200 may apply this rule only when explicitly indicated by network node 101. For example, by default, wireless device 200 does not adapt its measurement procedure to achieve serving cell interruption probability.

In addition or in the alternative to autonomously adapting the measurement procedure as described above, wireless device 200 may adapt the measurement procedure based on receiving an indication from network node 101 indicating that wireless device 200 is to adapt the measurement procedure. For example, wireless device 200 may obtain a SCell measurement cycle to be used for measuring on cells of the first SCC from network node 101.

Figure 5:
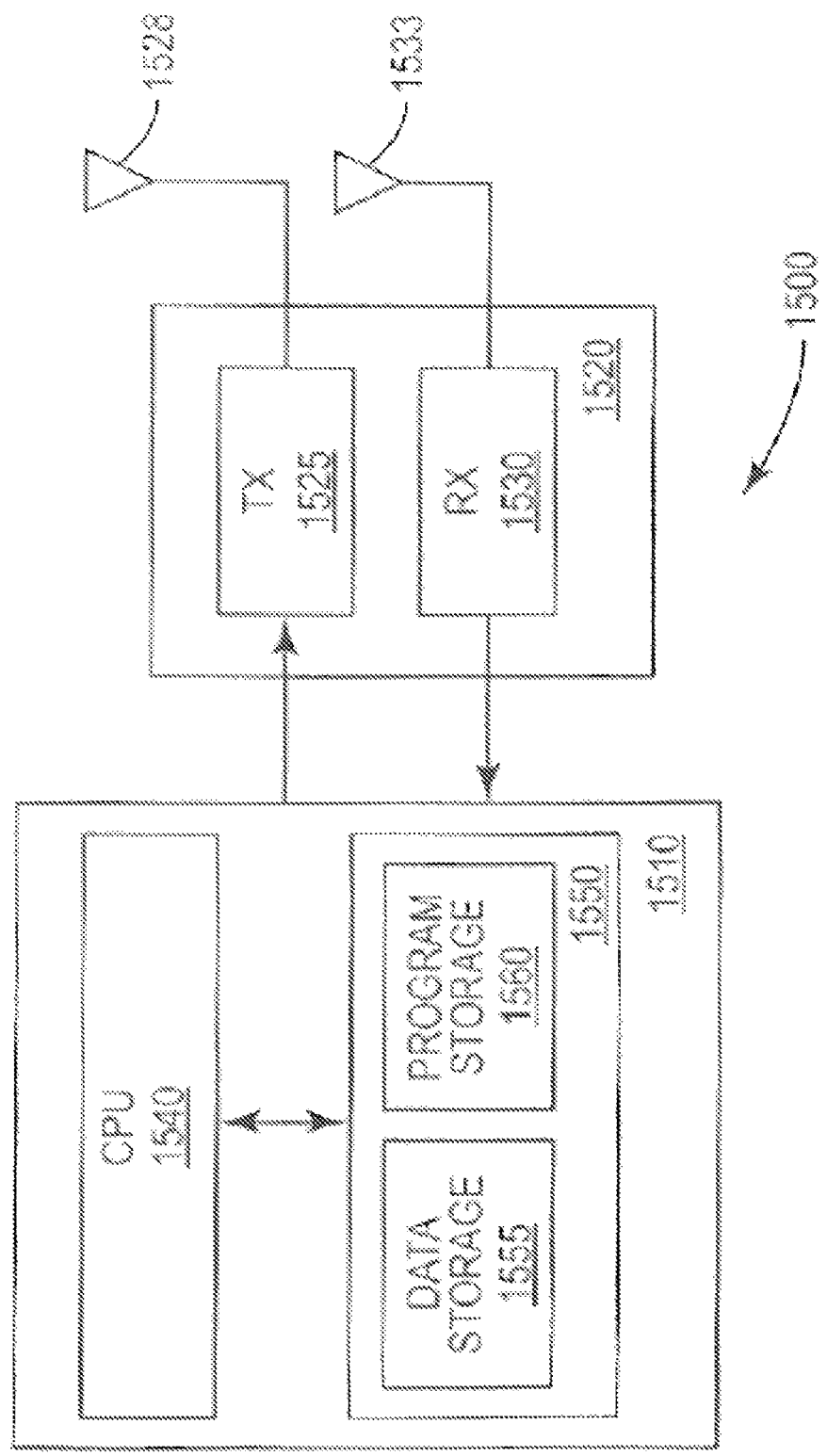
FIG. 5 illustrates an example of components of a wireless device, according to a particular embodiment.

Several of the techniques and methods described above may be implemented using radio circuitry and electronic data processing circuitry provided in a terminal. FIG. 5 illustrates features of an example terminal 1500 according to several embodiments of the present disclosure. Terminal 1500 may be used to implement wireless device 200 in certain embodiments. Terminal 1500 comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the disclosure, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 5, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the disclosure, additional details are not shown here.

Typical functions of the processing circuit 1510 include modulation and coding of transmitted signals and the demodulation and decoding of received signals. In several embodiments of the present disclosure, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

Figure 6:
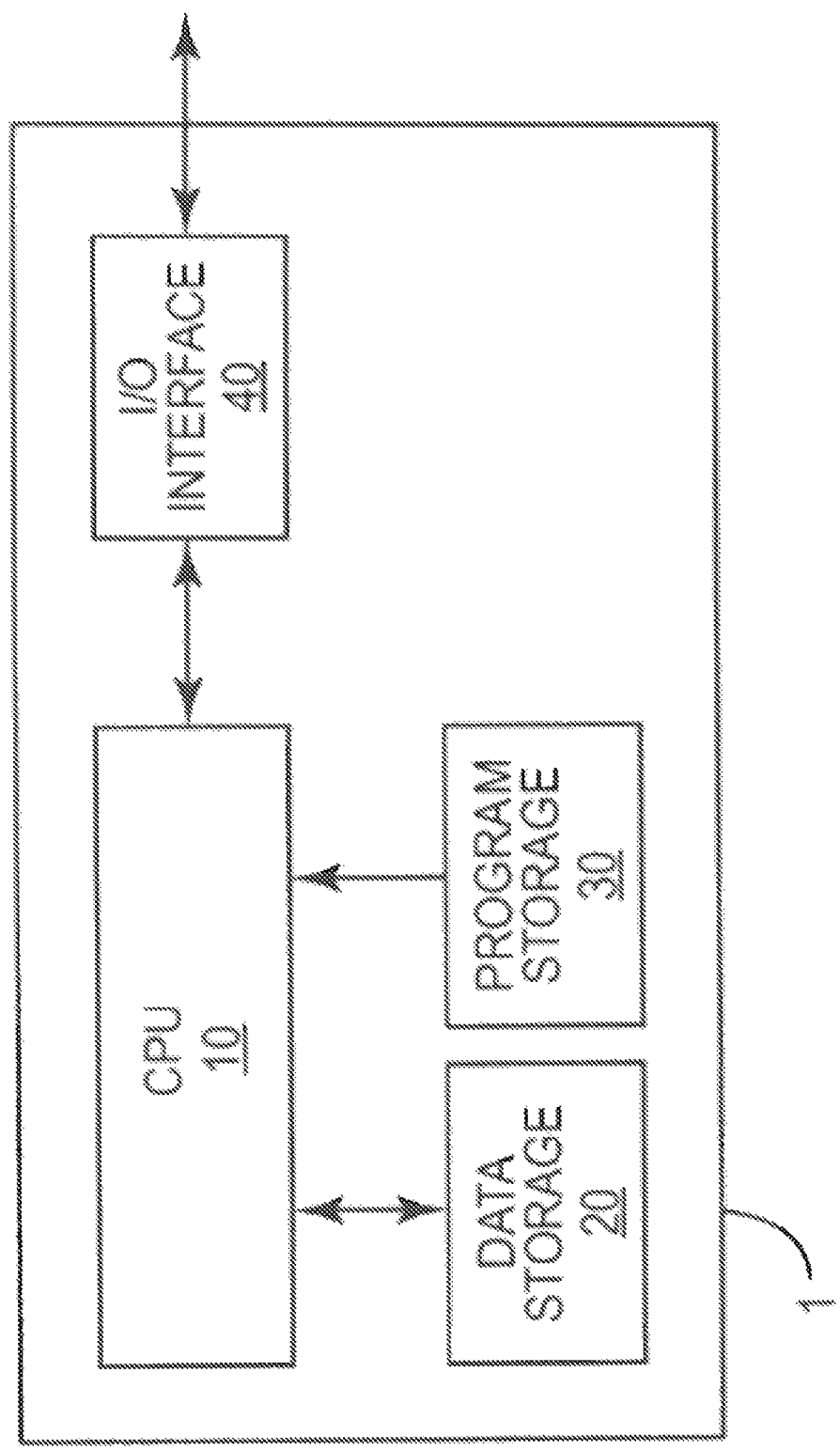
FIG. 6 illustrates an example of components of a network node, according to a particular embodiment.

Similarly, several of the techniques and processes described above can be implemented in a network node, such as an eNodeB or other node in a 3GPP network. FIG. 6 is a schematic illustration of a node 1 in which a method embodying any of the presently described network-node 101 based techniques can be implemented. A computer program for controlling the node 1 to carry out a method embodying the present disclosure is stored in a program storage 30, which comprises one or several memory devices. Data used during the performance of a method embodying the present disclosure is stored in a data storage 20, which also comprises one or more memory devices. During performance of a method embodying the present disclosure, program steps are fetched from the program storage 30 and executed by a Central Processing Unit (CPU) 10, retrieving data as required from the data storage 20. Output information resulting from performance of a method embodying the present disclosure can be stored back in the data storage 20, or sent to an Input/Output (I/O) interface 40, which includes a network interface for sending and receiving data to and from other network nodes and which may also include a radio transceiver for communicating with one or more terminals.

Accordingly, in various embodiments of the disclosure, processing circuits, such as the CPU 10 and memory circuits 20 and 30 in FIG. 6, are configured to carry out one or more of the techniques described in detail above. Likewise, other embodiments may include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 7:
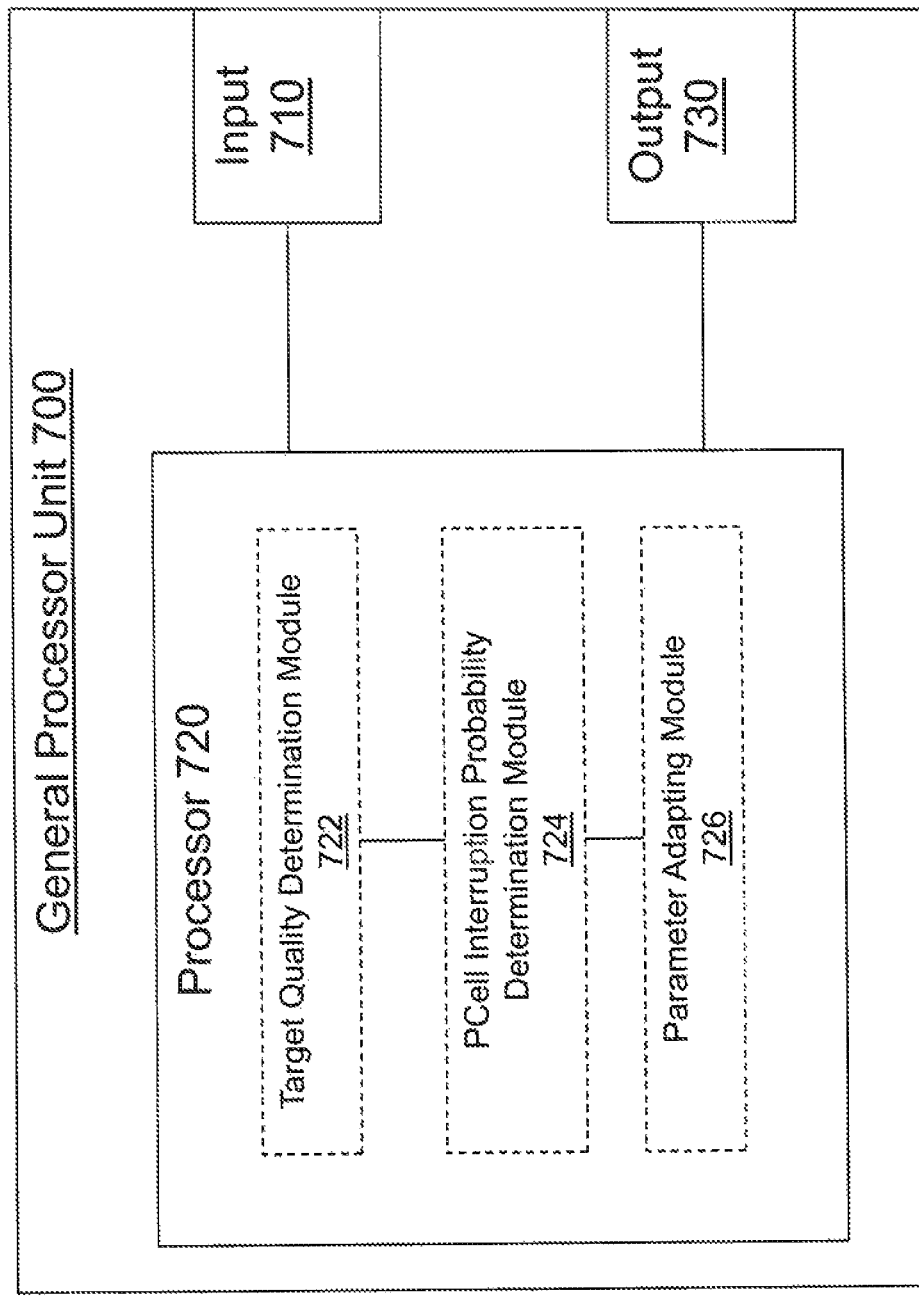
FIG. 7 illustrates an example of components of a general processor unit that may be included in a wireless device or that may be included in a network node, according to particular embodiments.

FIG. 7 illustrates an example of components of a general processor unit 700 that may be included in a wireless device 200 or that may be included in a network node 101, according to particular embodiments. General processor unit 700 comprises input 710, processor 720, and output 730. Processor 720 comprises a target quality determination module 722, a PCell interruption probability determination module, and a parameter adapting module.

In certain embodiments, general processor unit 700 may be configured for use in CPU 1540 of the embodiment of a wireless device 200 shown in FIG. 5. In the example, target quality determination module 722 obtains (404) a target quality for wireless device 200 to achieve for signal transmission between wireless device 200 and at least the PCell. Target quality determination module 722 may obtain the target quality based on information from input 710. The information from input 710 may be retrieved from memory (e.g., data storage 1555) or received from network node 101. PCell interruption probability determination module 724 determines (408) a PCell interruption probability corresponding to an SCell measurement cycle that can be used by wireless device 200 for measuring on one or more cells of a first SCC with a deactivated first SCell, the PCell interruption probability indicating a probability of missed ACK/NACK in uplink. For example, PCell interruption probability determination module 724 may determine the PCell interruption probability based on a pre-defined mapping associated with the SCell measurement cycle. Parameter adapting module 726 adapts (412), based on a comparison between the target quality and the PCell interruption probability, at least one measurement procedure that wireless device 200 uses when performing radio measurements on the cells of the first SCC, wherein the PCell interruption probability of the adapted measurement procedure makes it feasible to achieve the target quality. Parameter adapting module 726 may communicate parameters or instructions for performing the adapted measurement procedure via output 730.

In certain embodiments, general processor unit 700 may be configured for use in CPU 10 of the embodiment of a network node 101 shown in FIG. 6. In the example, target quality determination module 722 determines (304) a target quality for wireless device 200 to achieve for signal transmission between wireless device 200 and at least the PCell. Target quality determination module 722 may obtain the target quality based on information from input 710, such as information describing the relevant service (e.g., VoIP, speech, video streaming, packet data, etc.). PCell interruption probability determination module 724 determines (308) a PCell interruption probability corresponding to an SCell measurement cycle that can be used by the wireless device 200 for measuring on one or more cells of a first SCC with a deactivated first SCell, the PCell interruption probability indicating a probability of missed ACK/NACK in uplink. For example, PCell interruption probability determination module 724 may determine the PCell interruption probability based on a pre-defined mapping associated with the SCell measurement cycle. Parameter adapting module 726 adapts (312), based on a comparison between the target quality and the PCell interruption probability, at least one parameter related to the CA configuration of wireless device 200, wherein the at least one adapted parameter makes it feasible to achieve the target quality. Output 730 facilitates configuring (316) wireless device 200 with the at least one adapted parameter.

It will be appreciated by the person of skill in the art that various modifications may be made to the above described embodiments without departing from the scope of the present disclosure. For example, although embodiments of the present disclosure have been described with examples that include a communication system compliant to the 3GPP specified LTE standard specification, it should be noted that the solutions presented may be equally well applicable to other networks that support dual connectivity. The specific embodiments described above should therefore be considered exemplary rather than limiting the scope of the disclosure. Because it is not possible, of course, to describe every conceivable combination of components or techniques, those skilled in the art will appreciate that the present disclosure can be implemented in other ways than those specifically set forth herein, without departing from essential characteristics of the disclosure. The present embodiments are thus to be considered in all respects as illustrative and not restrictive.

Although the preceding embodiments have been described for example purposes, it will be appreciated that other example embodiments include variations of and extensions to these enumerated examples, in accordance with the detailed procedures and variants described above.

In the above-description, the terminology used is for the purpose of describing particular embodiments only and is not intended to be limiting. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, some embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of present disclosure. Accordingly, the above disclosed subject matter is to be considered illustrative, and not restrictive, and the appended examples of embodiments are intended to cover all such modifications, enhancements, and other embodiments, which fall within the spirit and scope of present disclosure. Thus, the scope of present disclosure are to be determined by the broadest permissible interpretation of the present disclosure, and shall not be restricted or limited by the foregoing detailed description.

The following list provides non-limiting examples of how certain aspects of the proposed solutions could be implemented. The examples are merely intended to illustrate how certain aspects of the proposed solutions could be implemented; however, the proposed solutions could also be implemented in other suitable manners. Examples include:

A method in a network node serving a CA capable UE, the method comprising determining a target quality for the UE to be achieved for signal transmission between the UE and at least the PCell; determining a pre-defined value of a PCell interruption probability of missed ACK/NACK in uplink corresponding to a SCell measurement cycle that can be used by the UE for measuring on cells of a first SCC with a deactivated first SCell; comparing the determined target quality with the determined pre-defined value of the PCell interruption probability of missed ACK/NACK in uplink; adapting at least one parameter related to the carrier aggregation (CA) configuration of the UE based on the comparison; and configuring the UE with the at least one adapted parameter.

A method in a CA capable UE served by a network node, the method comprising obtaining a target quality for the UE to be achieved for signal transmission between the UE and at least the PCell; determining a pre-defined value of a PCell interruption probability of missed ACK/NACK in uplink corresponding to a SCell measurement cycle that can be used by the UE for measuring on cells of a first SCC with a deactivated first SCell; comparing the determined target quality with the determined pre-defined value of the PCell interruption probability of missed ACK/NACK in uplink; adapting at least one measurement procedure to be used by the UE for doing radio measurements on the cells of the first SCC such that at least the PCell interruption probability may change with respect to the pre-defined value.

In some embodiments, adapting the measurement procedure comprises selecting a first measurement procedure for doing the said measurements provided the determined target quality is less than or equal to the determined PCell interruption probability; or selecting a second measurement procedure for doing the said measurements provided the determined target quality is greater than the determined PCell interruption probability. In some embodiments, the first procedure decrease the rate at which the UE retunes its radio receiver below a first threshold and/or decreases the rate at which to obtain the measurement samples below a second threshold. In some embodiments, the second procedure increases the rate at which the UE retunes its radio receiver above a first threshold and/or increases the rate at which the UE obtains the measurement samples above a second threshold in the second measurement procedure.

For purposes of illustration and explanation only, particular embodiments are described in the context of operating in a Radio Access Network (RAN) that communicates over radio communication channels with wireless devices (also referred to as UEs). It will be understood, however, any suitable type of communication network could be used. As used herein, a wireless device/UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) there between, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although certain terminology from 3GPP ($3^{rd}$ Generation Partnership Project) LTE (Long Term Evolution) is used in some example embodiments, this should not be seen as limiting. Other wireless systems, such as WCDMA, HSPA, WiMax (Worldwide Interoperability for Microwave Access), UMB (Ultra Mobile Broadband), HSDPA (High-Speed Downlink Packet Access), GSM (Global System for Mobile Communications), etc., may be used in other embodiments.

Also note that terminology such as network node (also referred to as base station, NodeB, eNodeB, or Evolved Node B) and wireless device (also referred to as User Equipment node or UE) should be considered non-limiting and does not imply a certain hierarchical relation between the two. In general, a base station (e.g., a "NodeB" or "eNodeB") and a wireless device or terminal (e.g., a "UE") may be considered as examples of respective different communications devices that communicate with each other over a wireless radio channel. While embodiments discussed herein may focus on wireless transmissions in a downlink from a NodeB to a UE, embodiments of the disclosed concepts may also be applied, for example, in an uplink.

The invention claimed is:

1. A method in a network node serving a wireless device capable of carrier aggregation, CA, operation involving a primary cell, PCell, that operates on a primary component carrier, PCC, and at least one secondary cell, SCell, that operates on a secondary component carrier, SCC, the method comprising:
   determining a target quality for the wireless device to achieve for signal transmission between the wireless device and at least the PCell; wherein the target quality comprises target block error rate (BLER), frame error rate (FER), bit error rate (BER), packet error rate (PER), signal-to-interference-plus-noise ratio (SINR) and signal-to-noise ratio (SNR); wherein the target quality is configured separately for uplink and downlink at the network node and at the wireless device;
   determining a PCell interruption probability corresponding to a SCell measurement cycle that can be used by the wireless device for measuring on one or more cells of a first SCC with a deactivated first SCell, the PCell interruption probability indicating a probability of missed ACK/NACK in uplink;
   adapting, based on a comparison between the target quality and the PCell interruption probability, at least one parameter related to a CA configuration of the wireless device, wherein the at least one adapted parameter makes it feasible to achieve the target quality; and
   configuring the wireless device with the at least one adapted parameter,
wherein the wireless device configured with the at least one adapted parameter transmits at a block rate that achieves the target quality.

2. The method of claim 1, wherein adapting the at least one parameter comprises one of the following:
   configuring the SCell measurement cycle above or equal to a first threshold if the corresponding PCell interruption probability is less than the target quality;
   configuring the SCell measurement cycle below the first threshold if the corresponding PCell interruption probability is equal to or above the target quality;
   activating the first SCell;
   comprises deconfiguring the first SCell; and
   performing a cell change to a radio access technology different than that of a current serving cell.

3. The method of claim 1, wherein the PCell interruption probability is pre-defined based on the SCell measurement cycle.

4. A method in a wireless device capable of carrier aggregation, CA, operation involving a primary cell, PCell, that operates on a primary component carrier, PCC, and a secondary cell, SCell, that operates on a secondary component carrier, SCC, the method comprising:
   obtaining a target quality for the wireless device to achieve for signal transmission between the wireless device and at least the PCell; wherein the target quality comprises target block error rate (BLER), frame error rate (FER), bit error rate (BER), packet error rate (PER), signal-to-interference-plus-noise ratio (SINR) and signal-to-noise ratio (SNR); wherein the target quality is configured separately for uplink and downlink at the network node and at the wireless device;
   determining a PCell interruption probability corresponding to a SCell measurement cycle that can be used by the wireless device for measuring on one or more cells of a first SCC with a deactivated first SCell, the PCell interruption probability indicating a probability of missed ACK/NACK in uplink;

adapting, based on a comparison between the target quality and the PCell interruption probability, at least one measurement procedure that the wireless device uses when performing radio measurements on the cells of the first SCC, wherein the PCell interruption probability of the adapted measurement procedure makes it feasible to achieve the target quality; and configuring the wireless device with the at least one adapted parameter, wherein the wireless device configured with the at least one adapted parameter transmits at a block rate that achieves the target quality.

5. The method of claim 4, wherein adapting the measurement procedure comprises, selecting a first measurement procedure for doing the measurements provided the target quality is less than or equal to the PCell interruption probability; and selecting a second measurement procedure for doing the measurements provided the target quality is greater than the determined PCell interruption probability.

6. The method of claim 5, wherein:

in the first measurement procedure, a rate at which to retune a radio receiver in the wireless device is decreased below a first threshold; and in the second measurement procedure, a rate at which to retune the radio receiver is increased above the first threshold.

7. The method of claim 6, wherein:

in the first measurement procedure, a rate at which to obtain measurement samples is decreased below a second threshold; and in the second measurement procedure, a rate at which to obtain measurement samples is increased above the second threshold.

8. The method of claim 4, further comprising, receiving an indication from a network node indicating the wireless device to adapt the measurement procedure; and adapting the measurement procedure based on the received indication.

9. A network node operable to serve a wireless device capable of carrier aggregation, CA, operation involving a primary cell, PCell, that operates on a primary component carrier, PCC, and at least one secondary cell, SCell, that operates on a secondary component carrier, SCC, the network node comprising a processor and a memory, wherein said memory contains instructions executable by said processor whereby the network node is operable to:

determine a target quality for the wireless device to achieve for signal transmission between the wireless device and at least the PCell; wherein the target quality comprises target block error rate (BLER), frame error rate (FER), bit error rate (BER), packet error rate (PER), signal-to-interference-plus-noise ratio (SINR) and signal-to-noise ratio (SNR); wherein the target quality is configured separately for uplink and downlink at the network node and at the wireless device;

determine a PCell interruption probability corresponding to a SCell measurement cycle that can be used by the wireless device for measuring on one or more cells of a first SCC with a deactivated first SCell, the PCell interruption probability indicating a probability of missed ACK/NACK in uplink;

adapt, based on a comparison between the target quality and the PCell interruption probability, at least one parameter related to a CA configuration of the wireless device, wherein the at least one adapted parameter makes it feasible to achieve the target quality; and configure the wireless device with the at least one adapted parameter, wherein the wireless device configured with the at least one adapted parameter transmits at a block rate that achieves the target quality.

10. The network node of claim 9, wherein adapting the at least one parameter comprises one of the following:

configuring the SCell measurement cycle above or equal to a first threshold if the corresponding PCell interruption probability is less than the target quality;

configuring the SCell measurement cycle below the first threshold if the corresponding PCell interruption probability is equal to or above the target quality;

activating the first SCell;

deconfiguring the first SCell; and performing a cell change to a radio access technology different than that of a current serving cell.

11. The network node of claim 9, wherein the PCell interruption probability is pre-defined based on the SCell measurement cycle.

12. The network node of claim 9, wherein adapting the at least one parameter comprises adapting the at least one parameter provided that the determined target quality is less than or equal to the PCell interruption probability.

13. A wireless device capable of carrier aggregation, CA, operation involving a primary cell, PCell, that operates on a primary component carrier, PCC, and a secondary cell, SCell, that operates on a secondary component carrier, SCC, the wireless device comprising a processor and a memory, wherein said memory contains instructions executable by said processor whereby the wireless device is operable to:

obtain a target quality for the wireless device to achieve for signal transmission between the wireless device and at least the PCell; wherein the target quality comprises target block error rate (BLER), frame error rate (FER), bit error rate (BER), packet error rate (PER), signal-to-interference-plus-noise ratio (SINR) and signal-to-noise ratio (SNR); wherein the target quality is configured separately for uplink and downlink at the network node and at the wireless device;

determine a PCell interruption probability corresponding to a SCell measurement cycle that can be used by the wireless device for measuring on one or more cells of a first SCC with a deactivated first SCell, the PCell interruption probability indicating a probability of missed ACK/NACK in uplink;

adapt, based on a comparison between the target quality and the PCell interruption probability, at least one measurement procedure that the wireless device uses when performing radio measurements on the cells of the first SCC, wherein the PCell interruption probability of the adapted measurement procedure makes it feasible to achieve the target quality; and configuring the wireless device with the at least one adapted parameter, wherein the wireless device configured with the at least one adapted parameter transmits at a block rate that achieves the target quality.

14. The wireless device of claim 13, wherein to adapt the measurement procedure, the wireless device is further operable to:

select a first measurement procedure for doing the measurements provided the target quality is less than or equal to the PCell interruption probability; and select a second measurement procedure for doing the measurements provided the target quality is greater than the PCell interruption probability.

15. The wireless device of claim 14, wherein:

in the first measurement procedure, a rate at which to retune the wireless device's radio receiver is decreased below a first threshold; and in the second measurement procedure, a rate at which to retune the wireless device's radio receiver is increased above the first threshold.

16. The wireless device of claim 15, wherein:

in the first procedure, a rate at which to obtain measurement samples is decreased below a second threshold; and in the second procedure, a rate at which to obtain measurement samples is increased above the second threshold.

17. The wireless device of claim 13, further operable to:

receive an indication from a network node indicating the wireless device to adapt the measurement procedure; and adapt the measurement procedure based on the received indication.

18. The wireless device of claim 13, wherein the wireless device obtains the target quality implicitly based on parameters; or the wireless device obtains the target quality explicitly via information received from a network node.

19. The wireless device of claim 13, wherein the wireless device determines the PCell interruption probability based on a pre-defined mapping that maps the SCell measurement cycle to the PCell interruption probability.

* * * * *